United States Patent Office 3,450,702
Patented June 17, 1969

3,450,702
2-OXO- OR THIO-4-ALKOXY OR ALKOXYALKOXY-ALKYL-HEXAHYDROPYRIMIDINES
Harro Petersen, Mannheim, Germany, assignor to Badische Anilin- & Soda-Fabrik Aktiengesellschaft, Ludwigshafen (Rhine), Germany
No Drawing. Filed July 12, 1966, Ser. No. 564,528
Claims priority, application Germany, May 25, 1966, B 87,285; June 4, 1966, B 87,425; June 15, 1966, B 87,567
Int. Cl. C07d *51/18;* A01n *7/00*
U.S. Cl. 260—251                                    6 Claims

ABSTRACT OF THE DISCLOSURE

Hexahydropyrimidines of Formula V, below, where $R^1$ and $R^2$ are H or 1–8 carbon alkyl, $R^3$ and $R^4$ are 1–4 carbon alkyl, $R^5$ is H or 1–2 carbon alkyl, and $R^6$ is 1–6 carbon alkyl or alkoxyalkyl (1–4 carbon alkoxy and 1–6 carbon alkyl); useful as intermediates to produce corresponding 4-hydroxyhexahydropyrimidines which in turn are intermediates for producing ureidohexahydroprimidones.

---

This invention relates to new and valuable hexahydropyrimidine derivatives and to the production of the same.

It is known that water-insoluble condensation products which consist of polyalkylenureas having different molecular weights are formed by reaction of urea and aldehydes in molar proportions in the presence of acids.

It is an object of this invention to provide a method of making new and valuable hexahydropyrimidine derivatives bearing an alkoxy group as substituent in 4-position.

Another object of the invention is the new compounds obtainable by the method.

These objects are realized by reacting a urea having the general formula:

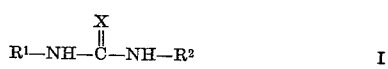

in which $R^1$ and $R^2$ denote hydrogen atoms or alkyl groups and X denotes an oxygen or sulfur atom with an aldehyde having the general formula:

in which $R^3$ and $R^4$ denote alkyl radicals, and an aldehyde having the formula:

$$R^5\text{—CHO} \qquad \qquad \text{III}$$

in which $R^5$ denotes a hydrogen atom or a methyl or ethyl radical in a molar ratio of about 1:1:1 in the presence of an alkanol or an α,ω-alkanediol etherified in α-position or ω-position with an alkanol, at elevated temperature with the addition of acid. The process may be carried out in the presence of inert solvents or suspension agents.

Those starting materials having the Formula I are preferred in which the radicals $R^1$ and $R^2$ denote hydrogen atoms or alkyl radicals having one to eight, preferably one to four, carbon atoms and X denotes an oxygen or sulfur atom. Thus not only may urea and thiourea be used, but also their monosubstituted and symmetrical disubstituted derivatives, such as N-methylurea, N,N'-dimethylurea, N,N'-dipropylurea or N-methyl-N-propylurea and the corresponding thioureas.

Those aldehydes having the Formula II are preferred in which the radicals $R^3$ and $R^4$ denote alkyl groups having one to four carbon atoms. Examples of suitable aldehydes are isobutyraldehyde, 2-ethylhexanal or 2-methylpentanal. It is preferred to use isobutyraldehyde.

Those aldehydes having the Formula III are preferred in which the radical $R^5$ denotes a hydrogen atom or an alkyl radical having one or two carbon atoms. Formaldehyde, acetaldehyde and propionaldehyde are therefore suitable starting materials.

The aldehydes and the urea are advantageously used in a molar ratio of 1:1:1. Slight deviations, for example up to 20 mole percent, from this ratio are possible.

The acetals, preferably the methylals and ethylals, of the aldehydes having the Formulae II and III may be used instead of the aldehydes themselves.

The preferred alkanols are those having the general Formula IV;

$$R^6\text{—OH} \qquad \qquad \text{IV}$$

in which $R^6$ denotes an alkyl radical having one to six carbon atoms or an alkyl radical having one to six carbon atoms which bears an alkoxy group having one to four carbon atoms as a substituent. For example methanol, ethanol, isopropanol, butanol, monomethyl glycol or the monoethyl ether of hexanediol-1,6 may be used. The alcohol is in general used in an amount of 50 to 300% by weight on the amount of urea used.

The acids may be strong inorganic or organic acids, i.e. those having a dissociation constant of at least $10^{-2}$, which are not oxidized under the reaction conditions, for example halogen hydracids, particularly dry hydrogen chloride, concentrated hydrochloric acid, hydrogen bromide, hydrobromic acid, sulfuric acid, oxalic acid, benzenesulfonic acid or p-toluenesulfonic acid. When aqueous acids are used, they should advantageously contain at least 5% by weight of acid. The acids are advantageously used in amounts of 1 to 30% by weight on the urea used.

It is advantageous to carry out the reaction at from 30° to 110° C., preferably from 50° to 80° C.

The process according to this invention involves a condensation reaction in which, with elimination of water, or alcohol, carbon-carbon combination occurs with simultaneous cyclization. The elimination of water or alcohol may be accelerated by adding more acid, if necessary while raising the reaction temperature, but in many cases it is possible to obtain the 4-alkoxy-2-oxohexahydropyrimidines and 4-alkoxy-2-thionohexahydropyrimidines at low temperatures in the presence of large amounts of acid. On the other hand it is also possible to carry out the reaction at higher temperatures in the presence of less acid. The temperature chosen will depend on the reactants and may be lower when the amount of acid added is increased and vice versa.

It is advantageous to carry out the reaction in the presence of solvents and/or diluents, such as dioxane, dimethylsulfoxide or dimethylformamide. Alcohols having the formula:

$$R^6\text{—OH}$$

in which $R^6$ has the meaning given above may also be used as solvents or diluents. The solvents or diluents are as a rule added in amounts of 30 to 500% by weight on the urea used.

The reaction may for example be carried out by adding the whole of the acid to a mixture of starting materials while stirring, if necessary with cooling and in the presence or absence of a solvent, the reaction mixture then being heated to a temperature of from 30° to 110° C., preferably from 50° to 80° C.

It is also possible only to add a portion of the acid, for example 0.5 to 10% by weight of the amount to be used, at the start, then to heat the reaction mixture to the reaction temperature and then to add the remainder of the acid.

The preferred new compounds which may be prepared by the process according to this invention have the following general formula:

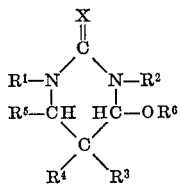

in which $R^1$ and $R^2$ denote hydrogen atoms or alkyl radicals having one to eight, preferably one to four, carbon atoms, $R^3$ and $R^4$ denote alkyl radicals having one to four carbon atoms, $R^5$ denotes a hydrogen atom or an alkyl radical having one or two carbon atoms, $R^6$ denotes an alkyl radical having one to six carbon atoms or an alkoxyalkyl radical in which the alkoxy group has one to four carbon atoms and the alkyl group has one to six carbon atoms, and X denotes an oxygen atom or a sulfur atom.

The new substances having the general Formula V are valuable intermediates. For example by reacting 2-oxo-5,5-dimethyl-4-methoxy-hexahydropyrimidine with urea at temperatures of from 50° to 70° C. in the presence of acids, methanol is eliminated and 2-oxo-5,5-dimethyl-4-ureidopyrimidine is obtained which may be used as a slow acting nitrogen fertilizer. Ureidohexahydropyrimidinones obtained in an analogous way from other compounds having the Formula V are likewise suitable as slow-release fertilizers.

The invention is illustrated by the following examples in which parts are parts by weight.

EXAMPLE 1

100 parts of 50% sulfuric acid is added while stirring at room temperature to a mixture of 300 parts of urea, 432 parts of isobutyraldehyde, 405 parts of a 37% formaldehyde solution (stabilized with 10% of methanol) and 1,600 parts of methanol. Solution takes place after a short time with the formation of the soluble mixed alkylol ether of urea. The reaction mixture is then heated for six hours at 68° to 72° C. under reflux. The product is neutralized with caustic soda solution, the deposited sodium sulfate is filtered off and the filtrate is evaporated to 1,200 parts under subatmospheric pressure and allowed to stand overnight, 2-oxo-4-methoxy-5,5-dimethylhexahydropyrimidine is precipitated. It is suction filtered and dried. The yield is 591 parts (75% of the theory). The crude product may be recrystallized from acetone. The melting point is 157° C.

*Analysis.*—$C_7H_{14}O_2N_2$ (158). Calculated: C, 53.2%; H, 8.86%; O, 20.2%; N, 17.7%. Found: C, 52.8%; H, 8.9%; O, 20.7%; N, 17.6%.

EXAMPLE 2

30 parts of hydrogen chloride is passed within ten to fifteen minutes into a mixture of 88 parts of symmetrical dimethylurea, 30 parts of paraformaldehyde and 72 parts of isobutyraldehyde in 500 parts of methanol at 30° C. with constant stirring and cooling of the reactor in an ice bath. The paraformaldehyde dissolves after a short time. Stirring is continued for another hour at 50° to 55° C. and the reaction solution is neutralized with caustic soda solution at room temperature, the precipitated common salt is filtered off and the filtrate is freed from excess methanol and water of reaction under subatmospheric pressure. 140 parts of 2 - oxo-1,3,5,5-tetramethyl-4-methoxyhexahydropyrimidine is obtained as crude product; it may be purified by distillation in a high vacuum.

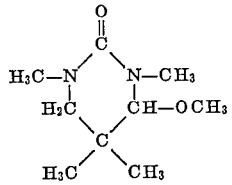

EXAMPLE 3

40 parts of concentrated hydrochloric acid is added while stirring to a mixture of 88 parts of symmetrical dimethylurea, 30 parts of paraformaldehyde and 128 parts of 2-ethylhexanal in 100 parts of methanol and 500 parts of dioxane. The reaction mixture is heated for four hours at refluxing temperature, and then cooled to room temperature. The product is neutralized with caustic soda solution and deposited common salt is filtered off. Dioxane, water and excess methanol are evaporated off under subatmospheric pressure. 225 parts of 2-oxo-4-methoxy-1,3 - dimethyl-5-ethyl-5-n-butylhexahydropyrimine is obtained as a liquid crude product. It is purified by distillation in a high vacuum (boiling point 115° to 118° C. at 0.2 mm.).

*Analysis.*—$C_{13}H_{26}O_2N_2$ (242). Calculated: C, 64.5%; H, 10.75%; O, 13.25%; N, 11.6%; $OCH_3$, 12.8%. Found: C, 64.4%; H, 10.8%; O, 13.2%; M, 12.1%; $OCH_3$, 12.7%.

EXAMPLE 4

5 parts of 80% sulfuric acid is added to a mixture of 300 parts of urea, 150 parts of paraformaldehyde, 360 parts of isobutyraldehyde and 1500 parts of methanol while stirring and cooling. Precipitation of polycondensation products with slight heating up takes place after a few minutes. Without separating the polycondensation products, the reaction mixture is heated with 60 parts of 80% sulfuric acid and heated for eight hours at reflux temperature. It is then neutralized with caustic soda after it has cooled to room temperature and the deposited sodium sulfate is filtered off. The filtrate is evaporated to 1100 parts under subatmospheric pressure, and allowed to stand overnight. The deposited 2-oxo-4-methoxy-5,5-dimethylhexahydropyrimidine is filtered off; 450 parts of crude product is obtained. It may be recrystallized from acetone; melting point 156° to 157° C.

*Analysis.*—$C_7H_{14}O_2N_2$ (158). Calculated: C, 53.2%; H, 8.86%; O, 20.2%; N, 17.7%; $OCH_3$, 19.6%. Found: C, 53.1%; H, 9.0%; O, 19.7%; N, 17.4%; $OCH_3$, 19.0%.

EXAMPLE 5

5 parts of concentrated hydrochloric acid is added at 30° C. to 176 parts of symmetrical dimethylurea in a mixture of 256 parts of 2-ethylhexanal, 60 parts of paraformaldehyde, 100 parts of methanol and 1,000 parts of dioxane, a polycondensation product thus being formed which is soluble in dioxane. Without separating the polycondensation product, 75 parts of concentrated hydrochloric acid is added and the reaction mixture is heated at refluxing temperature for five hours. The product is neutralized with caustic soda solution and dioxane, water and excess methanol are distilled off. The deposited common salt is filtered off and the liquid filtrate is distilled in a high vacuum. The main fraction has a boiling point range of 115° to 121° C. at 0.2 mm.

*Analysis.*—$C_{13}H_{26}O_2N_2$ (242). Calculated: C, 64.5%; H, 10.75%; O, 13.25%; N, 11.6%; $OCH_3$, 12.8%. Found:

C, 64.4%; H, 10.8%; O, 13.2%; N, 11.5%; OCH₃, 12.7%.

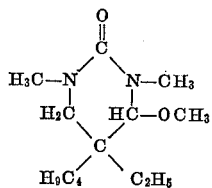

I claim:
1. A hexahydropyrimidine having the formula

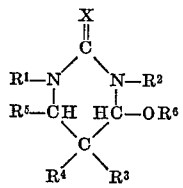

in which R¹ and R² denote hydrogen atoms or alkyl radicals having one to eight carbon atoms, R³ and R⁴ denote alkyl radicals having one to four carbon atoms, R⁵ denotes a hydrogen atom or an alkyl radical having one to two carbon atoms, R⁶ denotes an alkyl radical having one to six carbon atoms or an alkoxyalkyl radical having one to four carbon atoms in the alkoxy group and one to six carbon atoms in the alkyl group and X denotes an oxygen atom or a sulfur atom.

2. A hexahydropyrimidine having the formula given in claim 1 in which R¹ denotes an alkyl group having one to four carbon atoms.

3. A hexahydropyrimidine as claimed in claim 2 in which R² denotes an alkyl radical having one to four carbon atoms.

4. 2-oxo-4-methoxy-5,5-dimethylhexahydropyrimidine.

5. 2-oxo - 1,3,5,5 - tetramethyl-4-methoxyhexahydropyrimidine.

6. 2-oxo - 4 - methoxy-1,3-dimethyl-5-ethyl-5-n-butyl-hexahydropyrimidine.

References Cited

UNITED STATES PATENTS 2,887,485  5/1959  Yost _____ 260—251

ALEX MAZEL, *Primary Examiner.*

R. V. RUSH, *Assistant Examiner.*

U.S. Cl. X.R.

71—92